United States Patent

Amarante et al.

[15] 3,662,743
[45] May 16, 1972

[54] PRESSURE TRANSDUCER FOR CATHETER PRESSURE MEASUREMENT

[72] Inventors: Joseph A. Amarante, North Haven, Conn.; Robert E. Montgomery, Arcadia, Calif.

[73] Assignee: Corometrics Medical Systems, Inc., North Haven, Conn.

[22] Filed: Jan. 22, 1970

[21] Appl. No.: 4,982

[52] U.S. Cl..............................128/2 S, 73/388, 128/2.05 E, 128/2.06 F
[51] Int. Cl. ...........................................................A61b 5/00
[58] Field of Search............128/2 R, 2.05 D, 2.05 E, 2.05 R, 128/214 R, 348–350, DIG. 6, DIG. 12, DIG. 16; 73/388, 401, 402, 406

[56] References Cited

UNITED STATES PATENTS

| | | | |
|---|---|---|---|
| 3,499,434 | 3/1970 | Ullrich et al. | 128/2.05 D |
| 3,299,882 | 1/1967 | Masino | 128/2.05 E |
| 2,868,200 | 1/1959 | Gewecke | 128/214 R |

Primary Examiner—William E. Kamm
Attorney—Delio and Montgomery

[57] ABSTRACT

This specification primarily relates to a device for detecting pressure and pressure changes in a remote area and particularly in internal cavities through liquid coupling. A liquid filled tubing is inserted into the area to be monitored and coupled to an external transducer. A mounting for the transducer includes means to facilitate complete liquid filling of the tubing and exhaustion of air therefrom.

7 Claims, 10 Drawing Figures

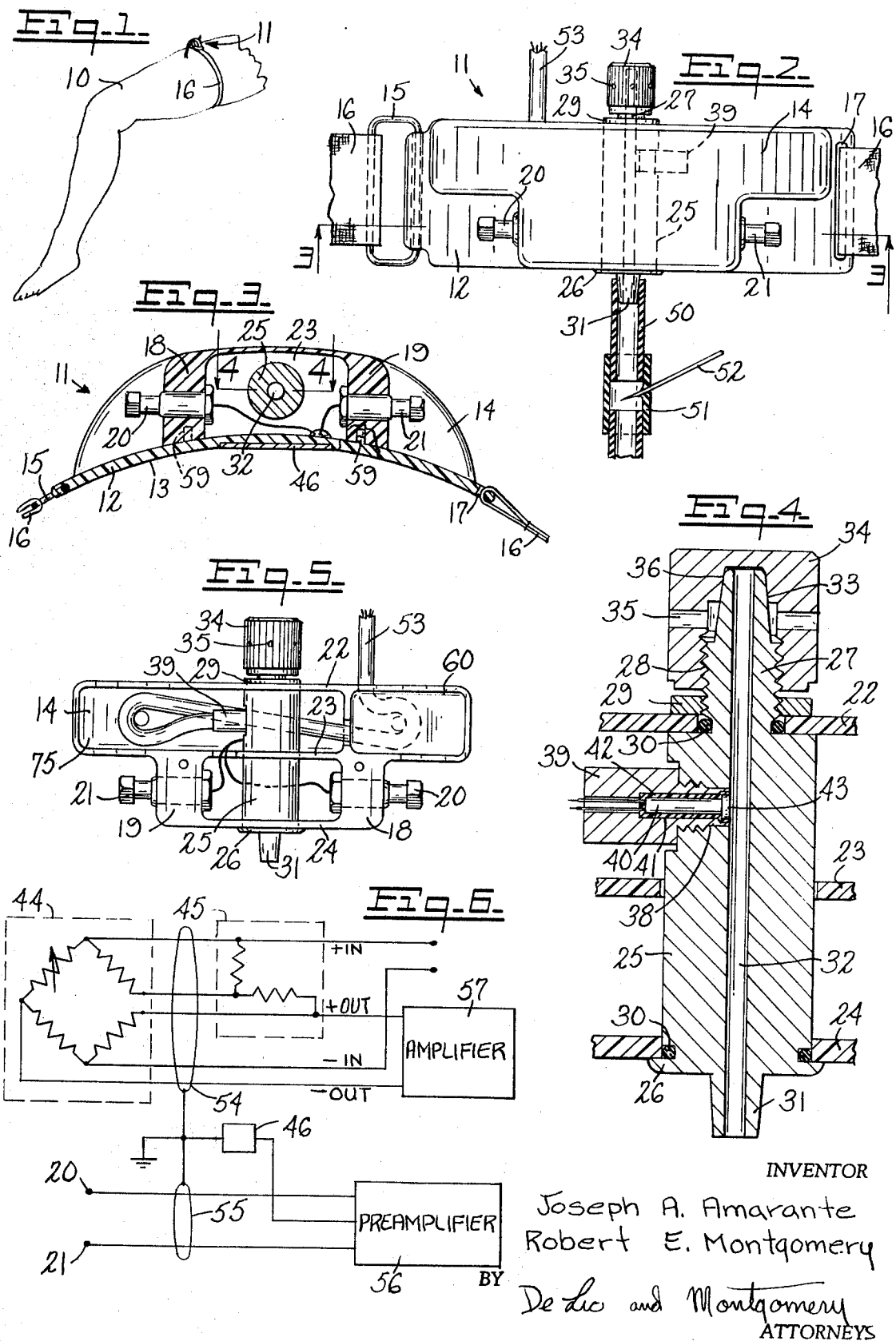

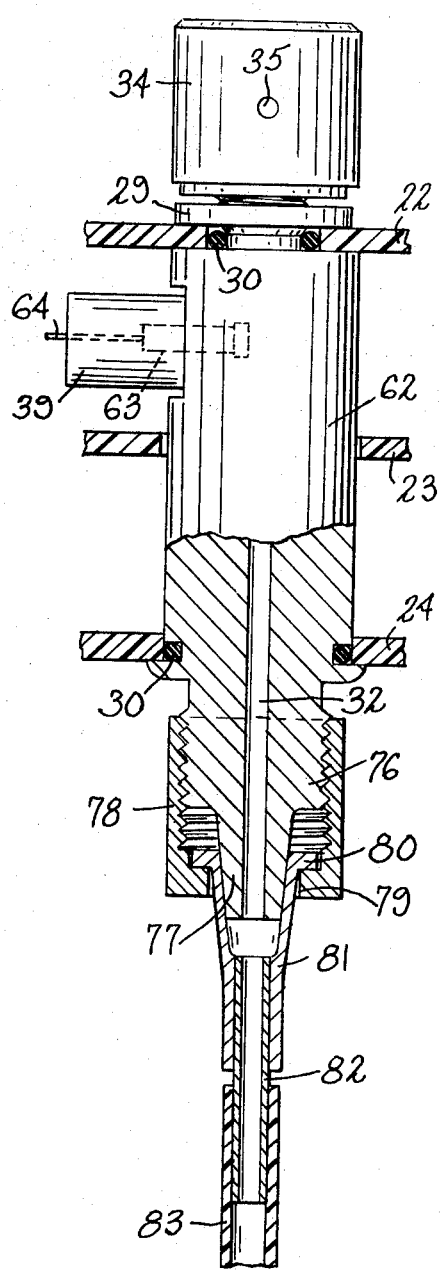
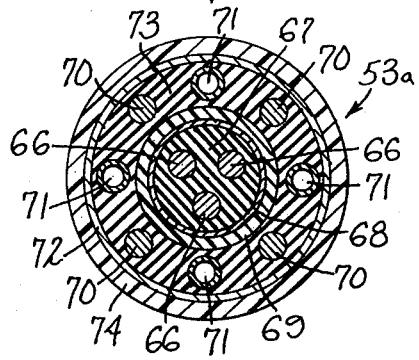
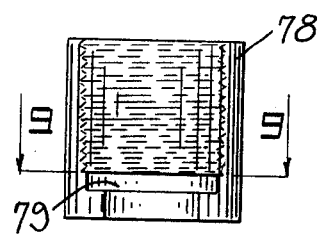
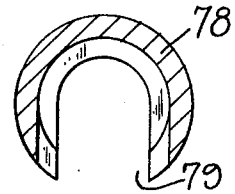

PRESSURE TRANSDUCER FOR CATHETER PRESSURE MEASUREMENT

This invention relates primarily to an arrangement for detecting pressure, and more particularly relates primarily to a device for detecting pressures internally of the human body.

A device embodying the invention is particularly adapted for use in conjunction with a fetal monitoring system as disclosed in co-pending application, Ser. No. 726,428 filed May 3, 1968, now U.S. Pat. No. 3,599,628, and assigned to the same assignee as this application.

This co-pending application discloses a system for continuously monitoring fetal heart rate in conjunction with intrauterine pressure to determine the existence or non-existence of fetal distress. The fetal heart rate is derived through an electronic system from the EKG through an electrode attached to the fetus while the intrauterine pressure is detected from a catheter which extends into the uterus. An external transducer is liquid-coupled to the uterus through the catheter. Thus, during labor contractions of the uterus the liquid in the catheter transmits the pressure to the external transducer from which it is monitored.

The present invention provides a new and improved apparatus for mounting the external transducer to the patient and for providing a liquid coupling between the uterus and the transducer.

While a specific use of the device has been mentioned for purposes of disclosure it will be understood that the liquid coupling and pressure-measuring device may be used for other applications for measuring pressure where liquid coupling is possible.

Briefly stated, the invention in one form thereof comprises an arcuately shaped plate which is adapted to be mounted to a limb of a person and has thereon a housing which receives an adaptor member having a passage therethrough. The adaptor member is constructed and arranged to have a pressure-sensing transducer in communication with the passage and further has an end cap which provides a liquid seal at the end of the passage and also facilitates completely filling of the catheter with a liquid and bleeding of any air in the catheter passage.

An object of this invention is to provide a new and improved catheter and transducing arrangement for sensing internal body pressure.

Another object of the invention is to provide a new and improved apparatus adapted to be mounted to a human limb and monitor intrauterine pressure.

Another object of the invention is to provide a device of the type described which includes new and improved means for exhausting air from the catheter and complete filling with liquid.

A further object of this invention is to provide a new and improved connector for use in monitoring fetal heartbeat and intrauterine pressure.

The features of the invention which are believed to be novel are particularly pointed out and distinctly claimed in the concluding portion of this specification.

The invention, however, both as to its organization and operation and further objects and advantages thereof may best be appreciated by reference to the following drawings, wherein:

FIG. 1 is a view of a human leg showing a mounting of a device embodying the invention thereon;

FIG. 2 is a plan view of a device embodying the invention;

FIG. 3 is a view seen in the plane of lines 3—3 of FIG. 2;

FIG. 4 is a view seen in the plane of lines 4—4 of FIG. 3;

FIG. 5 is an enlarged view in section of a portion of FIG. 4;

FIG. 6 is a schematic representation of a pressure-sensing transducer.

FIG. 7 is a view similar to FIG. 4 showing a modified transducer mounting member;

FIG. 8 is a view of a nut-like clamping member used in the apparatus of FIG. 7;

FIG. 9 is a view seen in the plane of lines 9—9 of FIG. 8, and

FIG. 10 is a cross sectional view of a cable used in the invention.

A device embodying the invention is adapted to be strapped to a human limb such as indicated at 10. Where the device is used to measure intrauterine pressure it is positioned on the inside of the thigh to be as close as possible to the center of rotation of the patient as she may turn. The apparatus generally comprises a housing member 11 having a platform or base portion 12 which defines an arcuate surface 13 shaped to generally fit around a human limb. A housing portion 14 extends upwardly from base portion 12. Base 12 carries at one end thereof a ring-like member 15 having a strap 16 thereon which is adapted to extend around the limb and be received through slot 17 to fasten the unit 11 to a limb. The housing portion is formed with walls 18 and 19 which carry terminal members 20 and 21, respectively. Housing member 11 further includes walls 22, 23, and 24 having apertures therein adapted to receive a transducer mounting member 25 therein. Member 25 has a flange 26 thereon which engages wall 24 and has an extending end 27 with threads 28 thereon extending through wall 22. A generally flat nut 29 is received on threads 28 and together with flange 26 clamps member 25 between walls 22 and 24. O-ring type seals 30 are provided at walls 22 and 24 to securely set member 25. Member 25 has a catheter-receiving projection 31 thereon and a passage 32 is defined completely therethrough.

The extending end 27 of member 25 extends into a taper 33 past threads 28. A cap member 34 is threadably received on threads 27 and has bleed passages 35 extending therethrough to passage 32. Cap member 34 has a mating internal tapered well 36 adapted to receive tapered portion 33.

When cap 34 is loose on member 25, passage 32 will communicate with passages 35. However, when cap 34 is tightened down on the extending portion 33 of member 25, the tapered surfaces will provide a liquid-tight fit and prevent communication between passage 32 and passages 35.

An aperture 38 is drilled and tapped in member 25 to provide communication into passage 32. Passage 38 threadably receives a mounting member 39 carrying therein a pressure transducer 40. Transducer 40 is received in a counterbored well 41 in member 39 and is mounted therein with waxes or other adhesives 42.

Transducer 40 is of the pressure-sensitive type and may be of the type manufactured by Kulite Semiconductor Products, Inc. of Ridgefield, New Jersey. This type of transducer has a pressure-sensitive area generally indicated at 43 and comprises a bridge circuit 44 as shown in FIG. 6. This transducer is a monolithic integrated circuit wheatstone bridge directly formed of a silicon diaphragm which is subjected to the pressure to be measured and may include temperature compensation resistors 45.

However, it is to be understood that any other suitable pressure transducers which will sense the pressure of fluid in passage 32 and provide a signal indicative of the pressure therein may be utilized. The fluids used may be a saline solution or distilled and sterilized water.

A metallic ground electrode in the form of a plate 46 is carried by base or platform 12.

In operation, the device 11 is strapped to the leg of the expectant mother, a flexible catheter which may be in the form of a polyethylene tube 50 is mounted on projection 31. Tube 50 is broken and has a sleeve 51 with a self-sealing property joining the two sections. The sleeve may be of a polysilicon polymer, silicon rubber which is available under the trademark Silastic by Dow-Corning. The catheter is then liquid filled as by inserting a hypodermic syringe 52 through the self-sealing sleeve 51 and injecting liquid therein. The cap 34 is backed off to allow egress of air from passage 32 in member 25. Then when air has been exhausted from passage 32 the cap is tightened down to seal off passage 32 from passages 35. The catheter 50 is then inserted into the uterus preferably adjacent the head of the fetus. The uterus which is filled with liquid and the liquid-filled catheter 50 will then provide a liquid coupling between the uterus and transducer 40. Alternatively, this catheter 50 may be filled with liquid after insertion in the uterus, or may be filled by liquid from the uterus after insertion due to labor contractions.

The liquid-filled catheter thus provides a liquid coupling between the uterus and the transducer 40. Any changes in pressure in the uterus due to labor contractions are accurately sensed by transducer 40 and a signal responsive thereto is generated. Transducer 40 is of the bridge type having a pressure-sensitive element in one of its arms. The bridge is excited by a source (not shown) over the IN-lines, and the output of the bridge is taken from the OUT-lines and applied to a differential amplifier.

Two cables in a common covering 53 are brought into the housing 14. One cable 54 having four leads and a shield is connected to the transducer lines. The other cable 55 having three lines and a shield is connected to terminals 20 and 21 and to patient ground plate 46. Cable 55 is then connected to a preamplifier 56 and the output leads to the bridge are connected to an amplifier 57, as disclosed in the aforementioned copending application.

The fetal electrodes are attached to terminals 20 and 21 with one electrode being attached to the fetus, preferably at the scalp thereof and the other grounded in the liquid in the uterus (not shown). The cable shields are tied together and to chassis ground of the instrument.

The housing 14 and base 12 are preferably of plastic and are separately molded. After the terminals 20 and 21 are mounted to the housing 14, and all electrical connections made, the housing is bonded to base 12. Pins 59 may be formed on base 12 to locate housing 14 thereon and also provide guides for cable 53. Cavity 60 is potted to anchor cable 53 to the housing.

Another embodiment of the transducer and housing is shown in FIGS. 7–10. A transducer housing member 62 is mounted in walls 22 and 24 as heretofore described and is essentially the same as member 25 with the exception of the catheter coupling end. The transducer 63 includes a reference tube 64 which is vented to allow the transducer to measure gage pressure. Tube 64 communicates with cavity 60 of housing 11 (FIG. 5). The transducer 63 is preferably of the type previously specified.

A composite cable 53a (FIG. 10) includes three inner conductors 66 surrounded by insulation 67 within a metallic shield 68 and an insulating jacket 69. The conductors 66 are adapted to connect between plate 46, terminals 20,21, and preamplifier 56 as shown in FIG. 6. Disposed about jacket 69 are four conductors 70 and four vent lines 71. Conductors 70 are the leads to bridge 44. A metallic shield 72 is disposed about insulation 73, and an insulating jacket 74 covers shield 72. Shield 72 is connected to shield 68 and to chassis ground. The insulations 67 and 73 may not be required if the conductors 66 and 70 are individually insulated. The vent lines 71 provide communication between the ambient atmosphere and reference tube 64 extending into cavity 75, so that the transducer 63 operates to measure gage pressure.

Transducer mounting member 62 is threaded at end portion 76 before tapered projection 77. An internally threaded cap member 78 is received on portion 76. Cap member 78 has a generally T-shaped slot 79 defined therein which receives the flanged end 80 of a tube holder 81. A tube 82 extends from holder 81 and is arranged to receive a catheter 83 thereon.

The holder 81 is initially received in slot 79 while the threaded members are loosely engaged. Then as cap 78 is threaded onto portion 76, holder 81 is drawn onto projection 77. The catheter 83 is then filled with liquid by any one of the methods previously described.

It may thus be seen that the invention provides an efficient technique for liquid-coupling a transducer to sense a pressure and further provides a convenient and efficient device for connecting the sensors to external electronic circuitry as disclosed in the aforementioned U.S. Pat. No. 3,599,628.

From the foregoing it may be seen that the objects of the invention set forth as well as those made apparent are efficiently attained. While preferred embodiments of the invention have been set forth for purposes of disclosure other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

What is claimed is:

1. A condition sensing device comprising a housing member having a passage therethrough and terminating in an external tapered surface, a closure member carried by said housing member for permitting egress of fluid from one end of said passage and for sealing said passage against egress of fluid therefrom, said closure member having a complimentary internal tapered surface adapted to make sealing contact with said external tapered surface, means on said housing member for connecting a catheter to the other end of said passage and a pressure-sensitive transducer carried by said housing member in pressure sensing communication with said passage and arranged to sense pressure of fluid therein, means on said closure member for lockingly engaging the housing member beyond said tapered surfaces thereof so that when said closure member is advanced onto said housing member a predetermined distance said tapered surfaces engage and provide a fluid seal, said closure member having a vent passage defined therein to vent the passage in the housing member to the ambient atmosphere when said tapered surfaces are not in sealing engagement.

2. The device of claim 1 further including a transducer mounting member, said transducer being carried by said mounting member, a boss defined in said housing member to said passage, said mounting member being received in said boss.

3. The device of claim 1 further including a base member defining an arcuate surface, said housing member being mounted to said base member.

4. The device of claim 1 further including an electrically conductive terminal carried by said base member and adapted to contact the skin of a patient.

5. The device of claim 1 further including a catheter coupled to said catheter coupling means, said catheter including a puncture self-sealing portion to permit liquid to be injected into said passage through the wall of said catheter.

6. The device of claim 1 where said means for lockingly engaging comprise threads on said closure member adapted to engage mating threads on said housing member.

7. A condition sensing device comprising a housing member having a passage therethrough, closure means carried by said member for permitting egress of fluid from one end of said passage and for sealing said passage against egress of fluid therefrom, means on said member for connecting a catheter to the other end of said passage and a pressure-sensitive transducer carried by said housing member in communication with said passage and arranged to sense pressure of fluid therein, a base member defining a surface adapted to contact a patient, said housing member being mounted to said base member, an electrically conductive member carried by said base member arranged to contact the skin of a patient, a pair of electrical terminals carried by said base member and a shielded electrical lead-out cable having lines connected to said terminals, the shield of said cable being electrically connected to said electrically conductive member.

* * * * *